G. S. MONSON.
HEATING UTENSIL.
APPLICATION FILED JULY 31, 1920.
1,388,116. Patented Aug. 16, 1921.
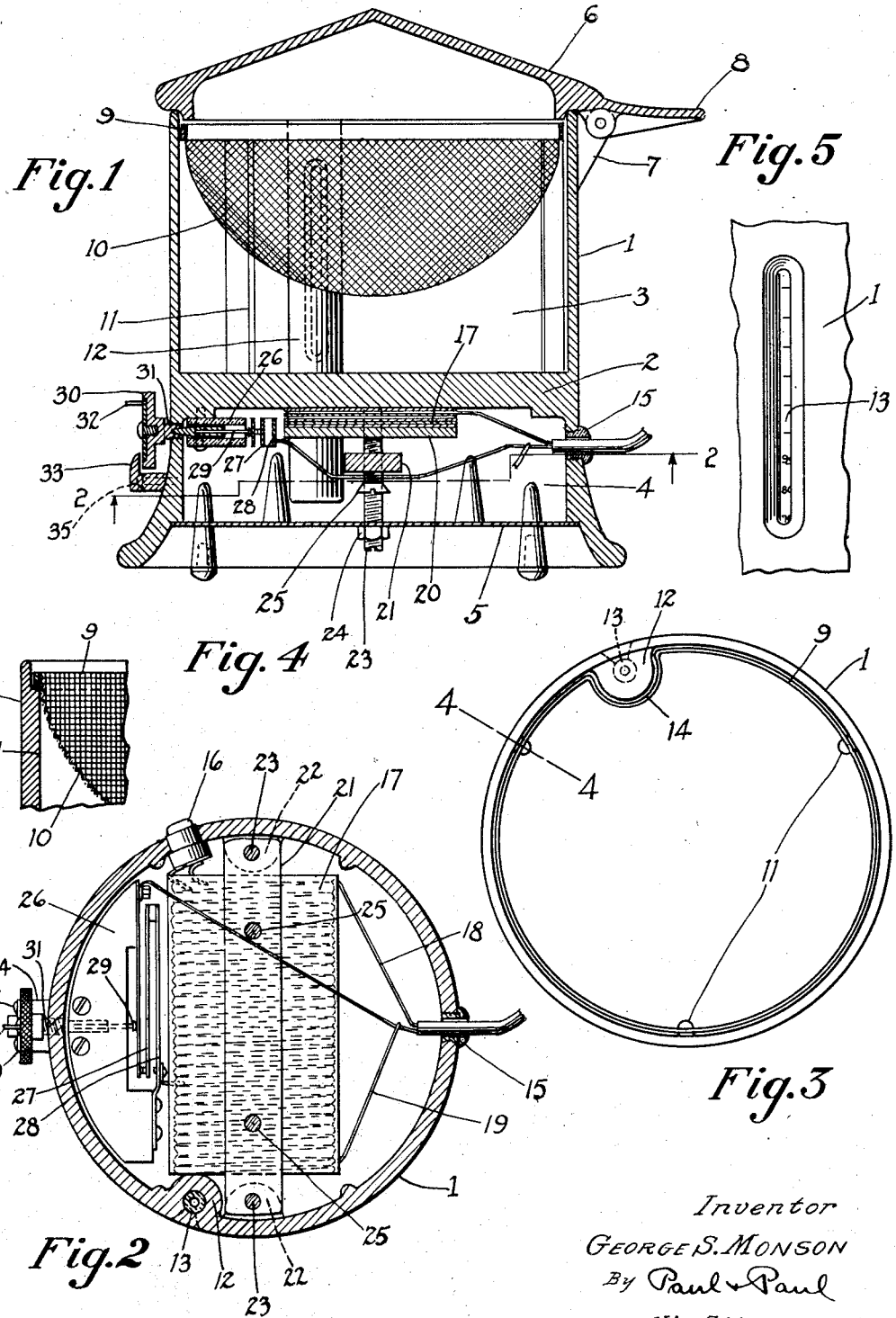
Inventor
GEORGE S. MONSON
By Paul & Paul
His Attorneys.

UNITED STATES PATENT OFFICE.

GEORGE S. MONSON, OF ST. PAUL, MINNESOTA, ASSIGNOR TO M. F. PATTERSON DENTAL SUPPLY COMPANY, OF CHICAGO, ILLINOIS, A CORPORATION OF ILLINOIS.

HEATING UTENSIL.

1,388,116.   Specification of Letters Patent.   Patented Aug. 16, 1921.

Application filed July 31, 1920. Serial No. 400,326.

*To all whom it may concern:*

Be it known that I, GEORGE S. MONSON, a citizen of the United States, resident of St. Paul, county of Ramsey, State of Minnesota, have invented certain new and useful Improvements in Heating Utensils, of which the following is a specification.

This invention relates to an improvement in heating utensils and more particularly relates to an improvement in utensils employed in dental offices for heating impression materials or plastic.

The object of the invention is to provide an improved heating utensil.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 1 is a vertical section of the novel utensil;

Fig. 2 is a section on the line 2—2 of Fig. 1;

Fig. 3 is a plan of the utensil with the cover removed;

Fig. 4 is a section on the line 4—4 of Fig. 3;

Fig. 5 is a detail of the thermometer housing.

While the utensil may be employed for a variety of uses, such as the sterilizing of surgical and dental instruments, the particular embodiment here disclosed is adapted to heat plastics such as impression compounds and waxes used in taking impressions in dental work. It comprises a preferably cylindrical casing 1 which is separated by a false bottom 2 into a compartment 3 and a heating chamber 4. The bottom of the heating chamber 4 is closed by a base 5. A cover 6 is pivotally mounted on the bracket 7 and is provided with a handle 8 by which means it may be raised from closed position and returned thereto.

The compartment 3 is adapted to receive water which is heated therein and is also provided with an object-holding means adapted to support the object or objects out of contact with the casing walls and freely exposed to the heating functions of the water. Such means is here shown as comprising a frame 9 having a fabric 10 secured thereto within which fabric the plastic or other objects are supported. The frame 9 is demountably supported on the upper ends of a plurality of ribs 11 formed on the interior of the compartment. These ribs are preferably integrally cast. This compartment is adapted to receive water which is heated to treat objects in the fabric 10. Means are provided for determining the temperature of the water in the compartment during use of the device. For this purpose a thermometer housing is preferably cast integrally with the casing. This housing 12 extends within the interior of the compartment and is vertically recessed to receive a thermometer 13. This housing recess is open at its lower end and is preferably plugged after insertion of the thermometer. The portion of the casing outer face is cut away adjacent the thermometer housing in order to permit view of the thermometer.

The frame 9 is provided with a reëntrant curve 14 adjacent the thermometer housing in order that any object held within the fabric 10 may be supported out of contact both with the casing walls and the thermometer housing.

The chamber 4 is the heating chamber of the receptacle and is preferably provided with an electric heating unit. The portion of the casing which incloses the heating chamber is provided with a plurality of apertures. In one of the apertures is inserted a plug 15 carrying the wires leading to the heating unit. In another one of the apertures an electric signaling means, such as a small lamp and socket 16, is inserted; while in another aperture a means for controlling the heating unit is inserted, both the lamp and controlling means being connected in the heating unit circuit.

The heating unit here disclosed forms the subject matter of another pending application, viz., Clarence B. Rogers, Serial No. 403,795, filed August 16th 1920, and, as no claim is made in this case to the novel features of such heating unit it need only be briefly described. It consists of a heating coil 17 in circuit with a source of electrical energy by means of the leads 18 and 19. The coil 17 comprises several layers of mica, one of the intermediate layers having the heating wire portion coiled thereon. The metal plate 20 is mounted to press the coil layers against the under face of the false bottom 2. A bar 21 is mounted on opposed lugs 22 formed on the interior of the casing 1 and is secured to the lugs by the screws 23. These screws also project through apertures formed in the base 5 of the casing and the base is held by means of a nut 24 on the end of each screw 23. A pair of screws 25 are received in adjustable threaded engagement in the bar 21 and terminally abut against the under face of the metal plate 20 to hold the plate in position. A thermostatic device 26 is tapped into the coil and serves to cause the current either to flow through the whole coil or through only the tapped portion thereof. The thermostatic function of this device is automatically achieved by the effect of heat upon a thermo-bar 27 which makes or breaks contact of that bar with the bar 28. The degree of heat necessary to cause functioning of the bar 27 may be controlled within certain limits by means of the pin 29 carried by the rotatable disk 30 having a stem 31 received in adjustable threaded engagement in an aperture in the casing 1. This disk may be manually rotated to a predetermined point by means of the pin 32. A member is preferably provided on the casing exterior to coöperate with this movable controlling means in order to indicate different control positions of the disk. Such a member is here shown as a pointer 33 which is fixedly secured to the casing 1 by means of a bracket 34 held by the screws 35.

The utensil is adapted to be used in the following manner. A quantity of water is placed in the compartment 3 and the current is turned on. The plastic is then placed within the fabric 10 and thus heated by the electrical coil to the desired temperature whereat it is maintained by the thermostatic device. While this embodiment of the invention discloses this type of heating coil it is obvious that various other types may be employed with this novel utensil.

I claim as my invention:

1. A heating utensil having a casing providing a compartment to receive objects to be heated, a heating chamber below said compartment, an electric heating unit in said chamber, the casing adjacent said chamber being apertured, and electric signal means projecting through said aperture whereby the heat-producing condition of the heating unit may be exteriorly signaled.

2. A heating utensil having a casing providing a compartment to receive objects to be heated, a chamber below said compartment, heating means in said chamber, the casing having an elongated recess, and a thermometer carried in said recess adjacent said compartment.

3. A heating utensil having a casing providing a compartment to receive objects to be heated, demountable means in said compartment to receive and hold the objects out of contact with the compartment casing portion, a chamber below the compartment, and heating means in said chamber.

4. A heating utensil having a casing providing a compartment to receive objects to be heated, means in said compartment to receive and hold the objects out of contact with the compartment casing portion, interior ribs formed on the compartment casing portion to support the object-holding means, a chamber below the compartment, and heating means in said chamber.

5. A heating utensil having a casing providing a compartment to receive objects to be heated, and a heating chamber below said compartment, a heating element in said chamber, the casing adjacent said chamber being apertured, means movable to control said heating element projecting through said aperture to the casing exterior.

6. A heating utensil having a casing providing a compartment to receive objects to be heated, a heating chamber below said compartment, a heating element in said chamber, the casing adjacent said chamber being apertured, means movable to control said heating element projecting through said aperture to the casing exterior and a member on the casing exterior to coöperate with said movable controlling means to indicate control positions.

7. A heating utensil having a casing providing a compartment to receive objects to be heated and a heating chamber below said compartment, the chamber being adapted to receive an electric heating unit, the casing adjacent inclosing said chamber having a plurality of apertures, means movable to control said unit projecting through one of said apertures, and electric signal means projecting through another of said apertures.

8. A heating utensil having a casing providing a compartment, a heating chamber below said compartment, a member adapted to hold objects to be heated, a frame for said member, a plurality of ribs interiorly provided on the portion of the casing inclosing the compartment, said ribs terminating adjacent the upper portion of the compartment whereby the frame may be supported by the ribs and the objects held out of contact with the compartment casing.

9. A heating utensil having a casing providing a compartment and a heating chamber below said compartment, heating means in said chamber, a member adapted to hold objects to be heated, a supporting frame for said member, means provided on the compartment interior to support said frame, a temperature-indicating means, a housing therefore provided on the casing interior, said frame being shaped to support said member out of contact with said housing.

In witness whereof, I have hereunto set my hand this 26th day of July 1920.

GEORGE S. MONSON.